UNITED STATES PATENT OFFICE.

CARLETON ELLIS, OF MONTCLAIR, NEW JERSEY, ASSIGNOR TO ELLIS-FOSTER CO., A CORPORATION OF NEW JERSEY.

FIBROUS PLASTIC COMPOSITION AND PROCESS OF MAKING SAME.

1,246,806. Specification of Letters Patent. Patented Nov. 13, 1917.

No Drawing. Application filed April 30, 1917. Serial No. 165,442.

*To all whom it may concern:*

Be it known that I, CARLETON ELLIS, a citizen of the United States, and a resident of Montclair, in the county of Essex and State of New Jersey, have invented certain new and useful Improvements in Fibrous Plastic Composition and Processes of Making Same, of which the following is a specification.

This invention relates to a product comprising fibrous material and sulfite liquor and to the process of making same all as more fully hereinafter set forth.

Sulfite cellulose waste liquor in a concentrated or solid form is ordinarily very soluble in water. Thus when used as a binder or impregnating material for wood and similar fibrous substances, it has the disadvantage of being affected by moisture, the waste liquor solids dissolving or leaching away. According to the present invention it is an object to coagulate or precipitate the waste liquor solids by means of suitable treatment, as for example, by subjecting the liquor to a precipitating or coagulating agent or to exposure to heat and the like; whereby the waste liquor solids are coagulated and preferably in part polymerized to form an insoluble body or compound. By this method of insolubilization a product is obtained which is sufficiently resistant to moisture to be capable of use in damp places or to exposure to air containing a high percentage of moisture.

In carrying out my invention I may take, for example, a fibrous substance such as sawdust or other material containing fiber including in some cases, asbestos and the like, and incorporate with it a quantity of the waste liquor solids. The latter may be admixed in a solid form, as for example, as a dry powder or as a paste or liquid but in any event it is preferable to eliminate from the crude waste liquor the major portion of the sulfites or sulfurous acid present which might oxidize to sulfates or sulfuric acid and have a destructive effect on the fiber in some cases. Thus by using liquor which has been concentrated the sulfurous acid is substantially removed during concentration and a product is obtained (especially if concentrated without neutralization so as to retain a part of its lignin acid in a free state) which will act advantageously as a binding agent. From 6 to 10% or more of the sulfite liquor material may be used according to the nature of the material which is to be bound together and which for convenience may be termed "fibrous bulking agent." The proportion of the binding agent may be varied according to the specific gravity, porosity, and the like, of this bulking agent. With these ingredients I preferably employ a chemical precipitating agent such as quick lime or hydrated lime which may be added in the form of a milk or cream or as the dry hydrate or any other suitable precipitating or coagulating agent. The mass may then be pressed into the shape of briquets, blocks or other suitable forms which may be allowed to stand preferably while being subjected to heat to accelerate the coagulating action until a substantially weather-proof product is obtained, or at least, one which is relatively resistant to the action of moisture. About one-half as much lime as sulfite liquor solids is a suitable addition, but this may be varied considerably, depending on circumstances.

While it is possible to use neutral, alkaline, hydrolyzed, or other forms of derivatives of sulfite waste liquor solids, or other similar cellulose liquors of a substantially equivalent character it is particularly my object to avail myself of the qualities of an acid concentrated waste sulfite liquor or its solids as these appear to be in a relatively more unstable form so that when subjected to coagulating conditions the insoluble producet is formed more readily.

When the material is to be shaped in a mold the mass may be subjected to suitable pressure as is customary in prepared molded articles. Molded products made in this way may be used as floor coating compounds, tool handles, blocks, and the like.

The sulfite liquor employed may be used in the solid form as stated, for example, by drying to a solid and grinding to a powder or preferably the sulfite liquor may be dried in an atomizing system which yields the material in a pulverulent condition. For example, the sulfite liquor may be dried by atomizing with heated air in the manner indicated in my patent application No. 165441. When such a powder is mixed directly with the bulking material, water may be then added so as to cause solution of the sulfite liquor solids to take place within the mass. Lime may be added at any stage during the mixing of these materials when a lime precipitant is desired. In some cases barium hydrate may be used as a precipitant or to aid in precipitating or coagulating the binding material.

To recapitulate, my invention relates to a composition comprising fibrous material such as wood material or wood fiber incorporated with or bound together by sulfite liquor solids, preferably by means of a solution prepared by dissolution of the dried solids in an aqueous medium, such dried solids preferably being produced by drying the liquor with the aid of atomization. Furthermore the sulfite liquor solids are preferably coagulated from solution or rendered insoluble, this being preferably carried out substantially *in situ*, and the invention further relates to the process of making such fibrous product which comprises bringing a soluble form of the waste liquor solids into contact with fibrous material, such waste liquor solids preferably being derived in the manner indicated and in coagulating such waste liquor solids in contact with said fibrous material preferably under pressure so as to yield the product aforesaid.

This application is in part at least a continuation of my co-pending application Serial No. 757,301.

What I claim is:—

1. The process of making shaped objects which comprises mixing fibrous material, acid sulfite liquor solids and lime and in insolubilizing the sulfite liquor solids in contact with the fibrous material.

2. The process of making shaped objects which comprises mixing fibrous material and acid sulfite liquor solids and in insolubilizing the sulfite liquor solids in contact with the fibrous material.

3. The process which comprises bringing fibrous material and sulfite liquor solids into contact, and in insolubilizing the sulfite liquor solids in contact with the fibrous material.

4. The process which comprises bringing fibrous material and acid sulfite liquor solids into contact, and in insolubilizing the sulfite liquor solids in contact with the fibrous material.

5. The process which comprises incorporating fibrous material and a solution prepared from dried sulfite liquor solids and in shaping the product.

6. The process which comprises bringing fibrous material and a solution of sulfite liquor solids into contact and in coagulating the sulfite liquor solids in contact with the fibrous material.

7. The process which comprises bringing fibrous material into contact with a solution prepared from sulfite liquor solids which have been dried by atomization, and in coagulating the sulfite liquor solids in contact with said fibrous material.

8. The process which comprises treating fiber with a solution prepared from sulfite liquor solids which have been dried by atomization, and in substantially insolubilizing such sulfite liquor solids.

9. As a new article of manufacture, fibrous material incorporated with previously dried cellulose sulfite waste liquor solids in a wet condition.

10. As a new article of manufacture fibrous material incorporated with previously dried atomized cellulose sulfite waste liquor solids.

11. As a new article of manufacture fibrous material incorporated with previously dried atomized acid cellulose sulfite waste liquor solids.

12. As a new article of manufacture wood fiber bound together by insolubilized cellulose sulfite waste liquor solids.

13. As a new article of manufacture wood fiber bound together by insolubilized acid cellulose sulfite waste liquor solids.

14. As a new article of manufacture wood material incorporated with insolubilized cellulose sulfite waste liquor solids.

15. As a new article of manufacture, fibrous material incorporated with insolubilized cellulose sulfite waste liquor solids.

CARLETON ELLIS.